US011340867B2

United States Patent
Li et al.

(10) Patent No.: US 11,340,867 B2
(45) Date of Patent: May 24, 2022

(54) COMPUTE-IN-MEMORY (CIM) BINARY MULTIPLIER

(71) Applicant: QUALCOMM Incorporated, San Diego, CA (US)

(72) Inventors: Xia Li, San Diego, CA (US); Zhongze Wang, San Diego, CA (US); Periannan Chidambaram, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 102 days.

(21) Appl. No.: 16/807,562

(22) Filed: Mar. 3, 2020

(65) Prior Publication Data

US 2021/0279036 A1   Sep. 9, 2021

(51) Int. Cl.
*G06F 7/46* (2006.01)

(52) U.S. Cl.
CPC .................. *G06F 7/463* (2013.01)

(58) Field of Classification Search
CPC ................ G06F 7/44–443; G06F 7/463
See application file for complete search history.

(56) References Cited

U.S. PATENT DOCUMENTS

| | | | | |
|---|---|---|---|---|
| 4,739,503 A * | 4/1988 | Armer | ...................... | G06F 7/502 708/702 |
| 6,014,759 A * | 1/2000 | Manning | ................ | G11C 29/48 365/189.05 |
| 6,252,426 B1 * | 6/2001 | Fulkerson | .......... | H03K 19/0948 326/104 |
| 2002/0125912 A1 * | 9/2002 | Asakura | ........... | H03K 19/09429 326/58 |
| 2008/0081458 A1 * | 4/2008 | Lin | ........................ | H01L 24/73 438/620 |
| 2014/0368236 A1 * | 12/2014 | Chromczak | .... | H03K 19/017581 326/41 |

OTHER PUBLICATIONS

"Binary Multiplier—Types & Binary Multiplication Calculator," Electrical Technology, Retrieved from the Internet: https://www.electricaltechnology.org/2018/05/binary-multiplier-types-binary-multiplication-calculator.html, retrieved on Mar. 2, 2020, 13 pages.

\* cited by examiner

*Primary Examiner* — Matthew D Sandifer
*Assistant Examiner* — Huy Duong
(74) *Attorney, Agent, or Firm* — Patterson & Sheridan, L.L.P.

(57) ABSTRACT

Certain aspects provide methods and apparatus for binary computation. An example circuit for such computation generally includes a memory cell having at least one of a bit-line or a complementary bit-line; a computation circuit coupled to a computation input node of the circuit and the bit-line or the complementary bit-line; and an adder coupled to the computation circuit, wherein the computation circuit comprises a first n-type metal-oxide-semiconductor (NMOS) transistor coupled to the memory cell, and a first p-type metal-oxide-semiconductor (PMOS) transistor coupled to the memory cell, drains of the first NMOS and PMOS transistors being coupled to the adder, wherein a source of the first PMOS transistor is coupled to a reference potential node, and wherein a source of the first NMOS transistor is coupled to the computation input node.

16 Claims, 18 Drawing Sheets

701

| X     | Weight | EN | Output |
|-------|--------|----|--------|
| 1 (+1) | 1 (+1) | 1  | 1 (+1) |
| 1 (+1) | 0 (-1) | 1  | 0 (-1) |
| 0 (-1) | 1 (+1) | 1  | 0 (-1) |
| 0 (-1) | 0 (-1) | 1  | 0 (-1) |
| 1 (+1) | 1 (+1) | 0  | Vdd/2  |
| 1 (+1) | 0 (-1) | 0  | Vdd/2  |
| 0 (-1) | 1 (+1) | 0  | Vdd/2  |
| 0 (-1) | 0 (-1) | 0  | Vdd/2  |

| BL | BLB | REN | RBL | RBLB |
|---|---|---|---|---|
| 1 (+1) | 0 (-1) | 1 | 1 (+1) | 0 (-1) |
| 0 (-1) | 1 (+1) | 1 | 0 (-1) | 1 (+1) |
| 1 (+1) | 0 (-1) | 1 | 1 (+1) | 0 (-1) |
| 0 (-1) | 1 (+1) | 1 | 0 (-1) | 1 (+1) |
| 1 (+1) | 0 (-1) | 0 | Vdd/2 | Vdd/2 |
| 0 (-1) | 1 (+1) | 0 | Vdd/2 | Vdd/2 |
| 1 (+1) | 0 (-1) | 0 | Vdd/2 | Vdd/2 |
| 0 (-1) | 1 (+1) | 0 | Vdd/2 | Vdd/2 |

*FIG. 8D*

COMPUTE-IN-MEMORY (CIM) BINARY MULTIPLIER

FIELD OF THE DISCLOSURE

The present disclosure generally relates to artificial neural networks and, more particularly, to techniques and apparatus for performing binary computations.

DESCRIPTION OF RELATED ART

An artificial neural network, which may be composed of an interconnected group of artificial neurons (e.g., neuron models), is a computational device or represents a method performed by a computational device. These neural networks may be used for various applications and/or devices, such as Internet Protocol (IP) cameras, Internet of Things (IoT) devices, autonomous vehicles, and/or service robots.

Convolutional neural networks (CNNs) are a type of feed-forward artificial neural network. Convolutional neural networks may include collections of artificial neurons that each have a receptive field and that collectively tile an input space. Convolutional neural networks have numerous applications. In particular, CNNs have broadly been used in the area of pattern recognition and classification.

In layered neural network architectures, the output of a first layer of artificial neurons becomes an input to a second layer of artificial neurons, the output of a second layer of artificial neurons becomes an input to a third layer of artificial neurons, and so on. Convolutional neural networks may be trained to recognize a hierarchy of features. Computation in convolutional neural network architectures may be distributed over a population of processing nodes, which may be configured in one or more computational chains. These multi-layered architectures may be trained one layer at a time and may be fine-tuned using back propagation.

SUMMARY

Certain aspects of the present disclosure are directed to methods and apparatus for binary computation.

Certain aspects provide a circuit for binary computation. The circuit generally includes a memory cell having at least one of a bit-line or a complementary bit-line; a computation circuit coupled to a computation input node of the circuit and the bit-line or the complementary bit-line; and an adder coupled to the computation circuit, wherein the computation circuit comprises a first n-type metal-oxide-semiconductor (NMOS) transistor coupled to the memory cell, and a first p-type metal-oxide-semiconductor (PMOS) transistor coupled to the memory cell, drains of the first NMOS and PMOS transistors being coupled to the adder, wherein a source of the first PMOS transistor is coupled to a reference potential node, and wherein a source of the first NMOS transistor is coupled to the computation input node.

Certain aspects provide a method for binary computation. The method generally includes reading a first computation parameter stored in a memory cell having at least one of a bit-line or a complementary bit-line; providing a second computation parameter to a computation input node of a computation circuit; computing a logical operation of the first computation parameter and the second computation parameter via the computation circuit coupled to the bit-line or the complementary bit-line, wherein the computation circuit comprises a first NMOS transistor coupled to the memory cell, and a first PMOS transistor coupled to the memory cell, wherein a source of the first PMOS transistor is coupled to a reference potential node, and wherein a source of the first NMOS transistor is coupled to the computation input node; and performing, via an adder, an add operation based on a signal at drains of the first NMOS and PMOS transistors.

Other aspects, advantages, and features of the present disclosure will become apparent after review of the entire application, including the following sections: Brief Description of the Drawings, Detailed Description, and the Claims.

BRIEF DESCRIPTION OF THE DRAWINGS

FIG. 7D illustrates a truth table corresponding to a computation system, in accordance with certain aspects of the present disclosure.

FIG. 8D illustrates a truth table corresponding to a computation system implemented with a digital latch circuit, in accordance with certain aspects of the present disclosure.

DETAILED DESCRIPTION

Certain aspects of the present disclosure provide methods and apparatus for in-memory convolution computations for artificial neural networks.

With reference now to the Figures, several exemplary aspects of the present disclosure are described. The word "exemplary" is used herein to mean "serving as an example, instance, or illustration." Any aspect described herein as "exemplary" is not necessarily to be construed as preferred or advantageous over other aspects.

Example Artificial Neural Networks

Figure 1:
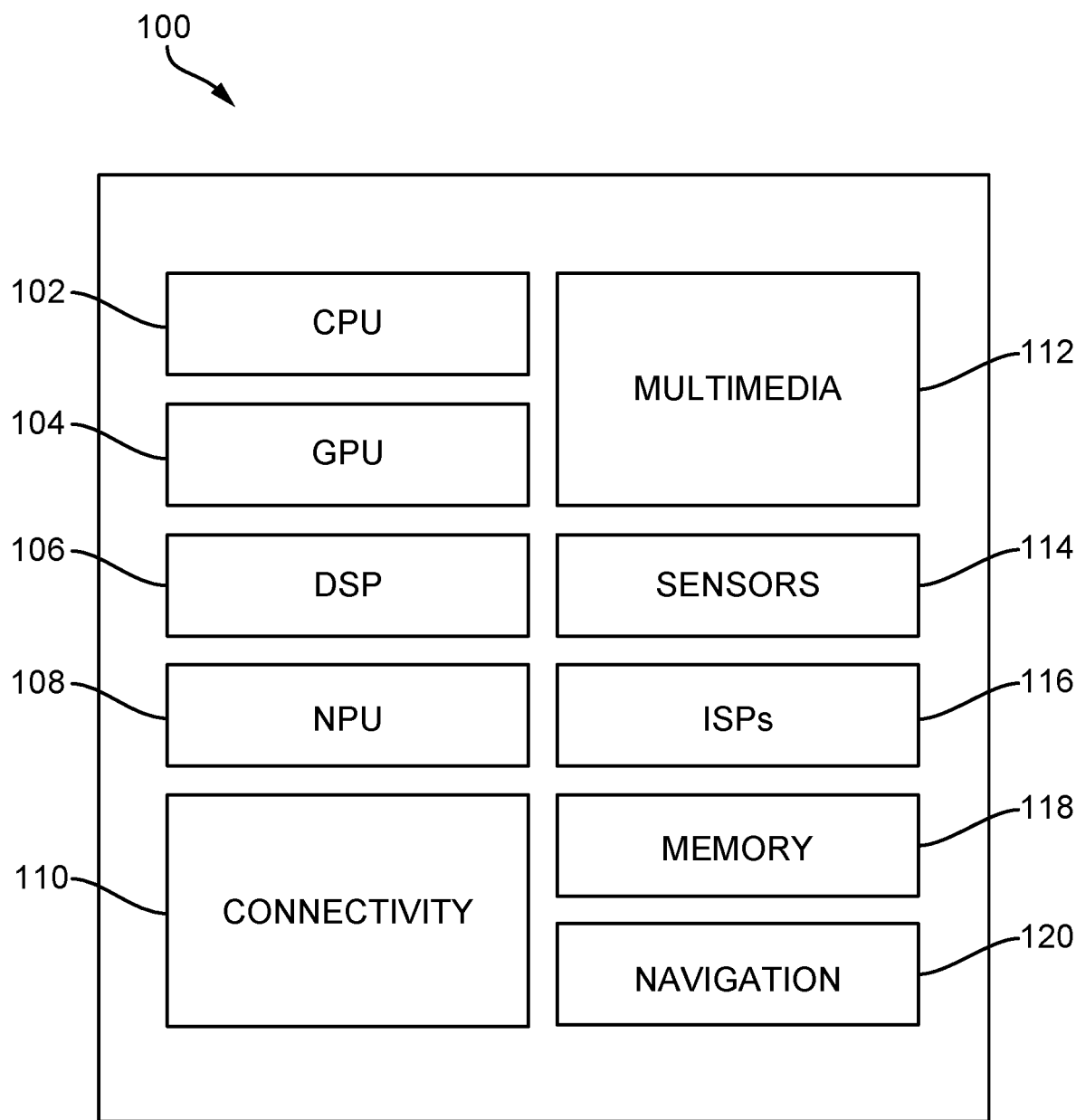
FIG. 1 illustrates an example implementation of a system-on-a-chip (SOC).

FIG. 1 illustrates an example implementation of a system-on-a-chip (SOC) 100, which may include a central processing unit (CPU) 102 or a multi-core CPU configured to perform a parallel Monte Carlo dropout function, in accordance with certain aspects of the present disclosure. Variables (e.g., neural signals and synaptic weights), system parameters associated with a computational device (e.g., neural network with weights), delays, frequency bin information, and task information may be stored in a memory block associated with a neural processing unit (NPU) 108, in a memory block associated with a CPU 102, in a memory block associated with a graphics processing unit (GPU) 104, in a memory block associated with a digital signal processor (DSP) 106, in a memory block 118, or may be distributed across multiple blocks. In certain aspects, weights may be stored in a static random-access memory (SRAM) configured to in-memory computations, as described in more detail herein. Instructions executed at the CPU 102 may be loaded from a program memory associated with the CPU 102 or may be loaded from a memory block 118.

The SOC 100 may also include additional processing blocks tailored to specific functions, such as a GPU 104, a DSP 106, a connectivity block 110, which may include fifth generation (5G) connectivity, fourth generation long term evolution (4G LTE) connectivity, Wi-Fi connectivity, USB connectivity, Bluetooth connectivity, and the like, and a multimedia processor 112 that may, for example, detect and recognize gestures. In one implementation, the NPU is implemented in the CPU, DSP, and/or GPU. The SOC 100 may also include a sensor processor 114, image signal processors (ISPs) 116, and/or navigation module 120, which may include a global positioning system.

The SOC 100 may be based on an ARM instruction set. In an aspect of the present disclosure, the instructions loaded into the CPU 102 may comprise code to search for a stored multiplication result in a lookup table (LUT) corresponding to a multiplication product of an input feature value and a filter weight. The instructions loaded into the CPU 102 may also comprise code to disable a multiplier during a multiplication operation of the multiplication product when a lookup table hit of the multiplication product is detected. In addition, the instructions loaded into the CPU 102 may comprise code to store a computed multiplication product of the input feature and the filter weight when a lookup table miss of the multiplication product is detected.

SOC 100 and/or components thereof may be configured to perform video compression and/or decompression according to aspects of the present disclosure discussed below. By using deep learning architectures to perform video compression and/or decompression, aspects of the present disclosure may accelerate the compression of video content on a device and transmission of the compressed video to another device and/or may accelerate the decompression of compressed video content received at the device.

Deep learning architectures may perform an object recognition task by learning to represent inputs at successively higher levels of abstraction in each layer, thereby building up a useful feature representation of the input data. In this way, deep learning addresses a major bottleneck of traditional machine learning. Prior to the advent of deep learning, a machine learning approach to an object recognition problem may have relied heavily on human engineered features, perhaps in combination with a shallow classifier. A shallow classifier may be a two-class linear classifier, for example, in which a weighted sum of the feature vector components may be compared with a threshold to predict to which class the input belongs. Human engineered features may be templates or kernels tailored to a specific problem domain by engineers with domain expertise. Deep learning architectures, in contrast, may learn to represent features that are similar to what a human engineer might design, but through training. Furthermore, a deep network may learn to represent and recognize new types of features that a human might not have considered.

A deep learning architecture may learn a hierarchy of features. If presented with visual data, for example, the first layer may learn to recognize relatively simple features, such as edges, in the input stream. In another example, if presented with auditory data, the first layer may learn to recognize spectral power in specific frequencies. The second layer, taking the output of the first layer as input, may learn to recognize combinations of features, such as simple shapes for visual data or combinations of sounds for auditory data. For instance, higher layers may learn to represent complex shapes in visual data or words in auditory data. Still higher layers may learn to recognize common visual objects or spoken phrases.

Deep learning architectures may perform especially well when applied to problems that have a natural hierarchical structure. For example, the classification of motorized vehicles may benefit from first learning to recognize wheels, windshields, and other features. These features may be combined at higher layers in different ways to recognize cars, trucks, and airplanes.

Neural networks may be designed with a variety of connectivity patterns. In feed-forward networks, information is passed from lower to higher layers, with each neuron in a given layer communicating to neurons in higher layers. A hierarchical representation may be built up in successive layers of a feed-forward network, as described above. Neural networks may also have recurrent or feedback (also called top-down) connections. In a recurrent connection, the output from a neuron in a given layer may be communicated to another neuron in the same layer. A recurrent architecture may be helpful in recognizing patterns that span more than one of the input data chunks that are delivered to the neural network in a sequence. A connection from a neuron in a given layer to a neuron in a lower layer is called a feedback (or top-down) connection. A network with many feedback connections may be helpful when the recognition of a high-level concept may aid in discriminating the particular low-level features of an input.

Figure 2A:
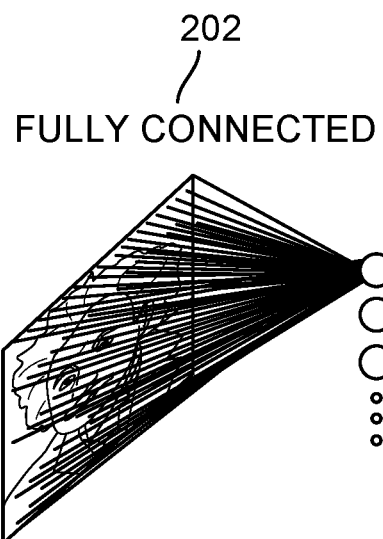
FIG. 2A illustrates an example of a fully connected neural network.
Figure 2B:
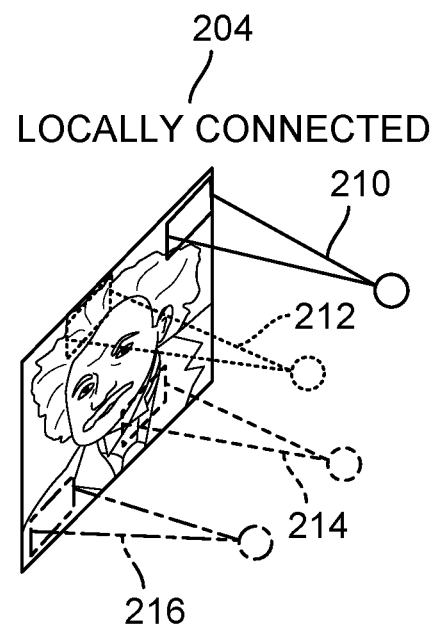
FIG. 2B illustrates an example of a locally connected neural network.

The connections between layers of a neural network may be fully connected or locally connected. FIG. 2A illustrates an example of a fully connected neural network 202. In a fully connected neural network 202, a neuron in a first layer may communicate its output to every neuron in a second layer, so that each neuron in the second layer will receive input from every neuron in the first layer. FIG. 2B illustrates an example of a locally connected neural network 204. In a locally connected neural network 204, a neuron in a first layer may be connected to a limited number of neurons in the second layer. More generally, a locally connected layer of the locally connected neural network 204 may be configured so that each neuron in a layer will have the same or a similar connectivity pattern, but with connections strengths that may have different values (e.g., 210, 212, 214, and 216). The locally connected connectivity pattern may give rise to spatially distinct receptive fields in a higher layer, because the higher layer neurons in a given region may receive inputs that are tuned through training to the properties of a restricted portion of the total input to the network.

Figure 2C:
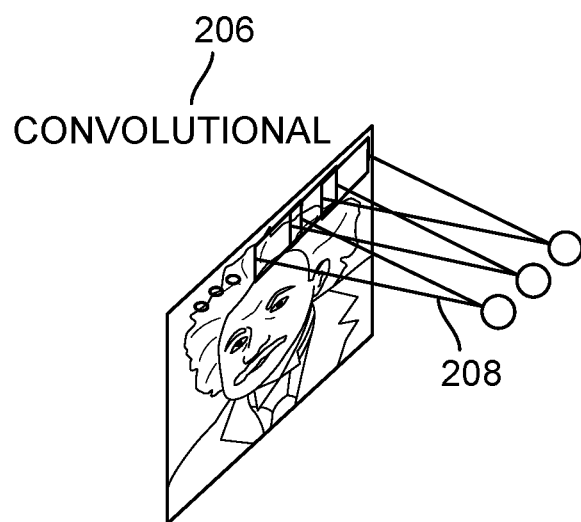
FIG. 2C illustrates an example of a convolutional neural network.

One example of a locally connected neural network is a convolutional neural network. FIG. 2C illustrates an example of a convolutional neural network 206. The convolutional neural network 206 may be configured such that the connection strengths associated with the inputs for each neuron in the second layer are shared (e.g., 208). Convolutional neural networks may be well suited to problems in which the spatial location of inputs is meaningful. Convolutional neural network 206 may be used to perform one or more aspects of video compression and/or decompression, according to aspects of the present disclosure.

Figure 2D:
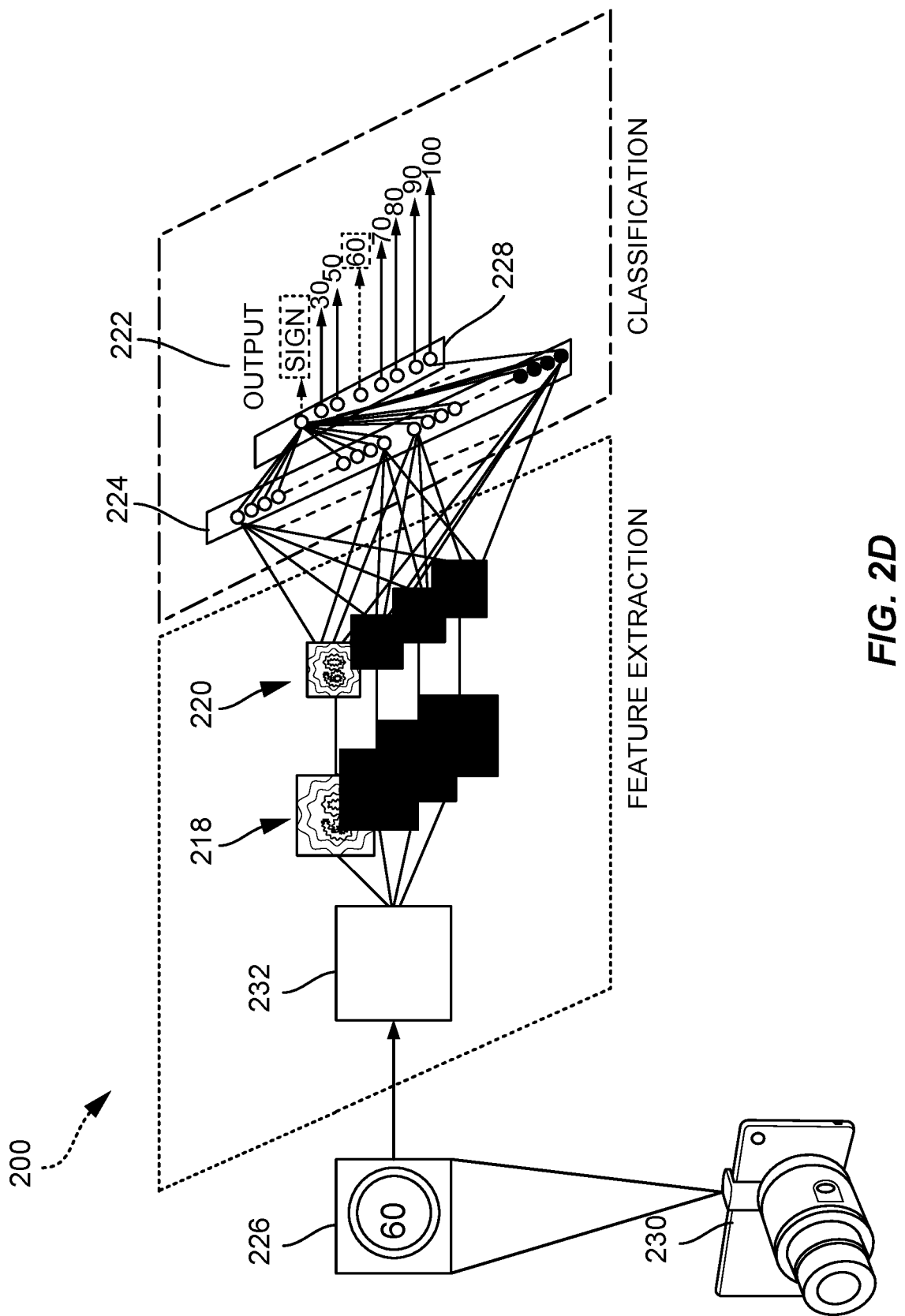
FIG. 2D illustrates a detailed example of a deep convolutional network (DCN) designed to recognize visual features from an image.

One type of convolutional neural network is a deep convolutional network (DCN). FIG. 2D illustrates a detailed example of a DCN 200 designed to recognize visual features from an image 226 input from an image capturing device 230, such as a car-mounted camera. The DCN 200 of the current example may be trained to identify traffic signs and a number provided on the traffic sign. Of course, the DCN 200 may be trained for other tasks, such as identifying lane markings or identifying traffic lights.

The DCN 200 may be trained with supervised learning. During training, the DCN 200 may be presented with an image, such as the image 226 of a speed limit sign, and a forward pass may then be computed to produce an output 222. The DCN 200 may include a feature extraction section and a classification section. Upon receiving the image 226, a convolutional layer 232 may apply convolutional kernels (not shown) to the image 226 to generate a first set of feature maps 218. As an example, the convolutional kernel for the convolutional layer 232 may be a 5×5 kernel that generates 28×28 feature maps. In the present example, because four different feature maps are generated in the first set of feature maps 218, four different convolutional kernels were applied to the image 226 at the convolutional layer 232. The convolutional kernels may also be referred to as filters or convolutional filters.

The first set of feature maps 218 may be subsampled by a max pooling layer (not shown) to generate a second set of feature maps 220. The max pooling layer reduces the size of the first set of feature maps 218. That is, a size of the second set of feature maps 220, such as 14×14, is less than the size of the first set of feature maps 218, such as 28×28. The reduced size provides similar information to a subsequent layer while reducing memory consumption. The second set of feature maps 220 may be further convolved via one or more subsequent convolutional layers (not shown) to generate one or more subsequent sets of feature maps (not shown).

In the example of FIG. 2D, the second set of feature maps 220 is convolved to generate a first feature vector 224. Furthermore, the first feature vector 224 is further convolved to generate a second feature vector 228. Each feature of the second feature vector 228 may include a number that corresponds to a possible feature of the image 226, such as "sign," "60," and "100." A softmax function (not shown) may convert the numbers in the second feature vector 228 to a probability. As such, an output 222 of the DCN 200 is a probability of the image 226 including one or more features.

In the present example, the probabilities in the output 222 for "sign" and "60" are higher than the probabilities of the others of the output 222, such as "30," "40," "50," "70," "80," "90," and "100." Before training, the output 222 produced by the DCN 200 is likely to be incorrect. Thus, an error may be calculated between the output 222 and a target output. The target output is the ground truth of the image 226 (e.g., "sign" and "60"). The weights of the DCN 200 may then be adjusted so the output 222 of the DCN 200 is more closely aligned with the target output. In certain aspects, the weights of the DCN 200 may be stored in an SRAM configured for in-memory computations, as described in more detail herein.

To adjust the weights, a learning algorithm may compute a gradient vector for the weights. The gradient may indicate an amount that an error would increase or decrease if the weight were adjusted. At the top layer, the gradient may correspond directly to the value of a weight connecting an activated neuron in the penultimate layer and a neuron in the output layer. In lower layers, the gradient may depend on the value of the weights and on the computed error gradients of the higher layers. The weights may then be adjusted to reduce the error. This manner of adjusting the weights may be referred to as "back propagation" as it involves a "backward pass" through the neural network.

In practice, the error gradient of weights may be calculated over a small number of examples, so that the calculated gradient approximates the true error gradient. This approximation method may be referred to as stochastic gradient descent. Stochastic gradient descent may be repeated until the achievable error rate of the entire system has stopped decreasing or until the error rate has reached a target level. After learning, the DCN may be presented with new images (e.g., the speed limit sign of the image 226) and a forward pass through the network may yield an output 222 that may be considered an inference or a prediction of the DCN.

Deep belief networks (DBNs) are probabilistic models comprising multiple layers of hidden nodes. DBNs may be used to extract a hierarchical representation of training data sets. A DBN may be obtained by stacking up layers of Restricted Boltzmann Machines (RBMs). An RBM is a type of artificial neural network that can learn a probability distribution over a set of inputs. Because RBMs can learn a probability distribution in the absence of information about the class to which each input should be categorized, RBMs are often used in unsupervised learning. Using a hybrid unsupervised and supervised paradigm, the bottom RBMs of a DBN may be trained in an unsupervised manner and may serve as feature extractors, and the top RBM may be trained in a supervised manner (on a joint distribution of inputs from the previous layer and target classes) and may serve as a classifier.

Deep convolutional networks (DCNs) are networks of convolutional networks, configured with additional pooling and normalization layers. DCNs have achieved state-of-the-art performance on many tasks. DCNs can be trained using supervised learning in which both the input and output targets are known for many exemplars and are used to modify the weights of the network by use of gradient descent methods.

DCNs may be feed-forward networks. In addition, as described above, the connections from a neuron in a first layer of a DCN to a group of neurons in the next higher layer are shared across the neurons in the first layer. The feed-forward and shared connections of DCNs may be exploited for fast processing. The computational burden of a DCN may be much less, for example, than that of a similarly sized neural network that comprises recurrent or feedback connections.

The processing of each layer of a convolutional network may be considered a spatially invariant template or basis projection. If the input is first decomposed into multiple channels, such as the red, green, and blue channels of a color image, then the convolutional network trained on that input may be considered three-dimensional, with two spatial dimensions along the axes of the image and a third dimension capturing color information. The outputs of the convolutional connections may be considered to form a feature map in the subsequent layer, with each element of the feature map (e.g., 220) receiving input from a range of neurons in the previous layer (e.g., feature maps 218) and from each of the multiple channels. The values in the feature map may be further processed with a non-linearity, such as a rectification, max(0,x). Values from adjacent neurons may be further pooled, which corresponds to down sampling, and may provide additional local invariance and dimensionality reduction. Normalization, which corresponds to whitening, may also be applied through lateral inhibition between neurons in the feature map.

The performance of deep learning architectures may increase as more labeled data points become available or as computational power increases. Modern deep neural networks are routinely trained with computing resources that are thousands of times greater than what was available to a typical researcher just fifteen years ago. New architectures and training paradigms may further boost the performance of deep learning. Rectified linear units may reduce a training issue known as vanishing gradients. New training techniques may reduce over-fitting and thus enable larger models to achieve better generalization. Encapsulation techniques may abstract data in a given receptive field and further boost overall performance.

Figure 3:
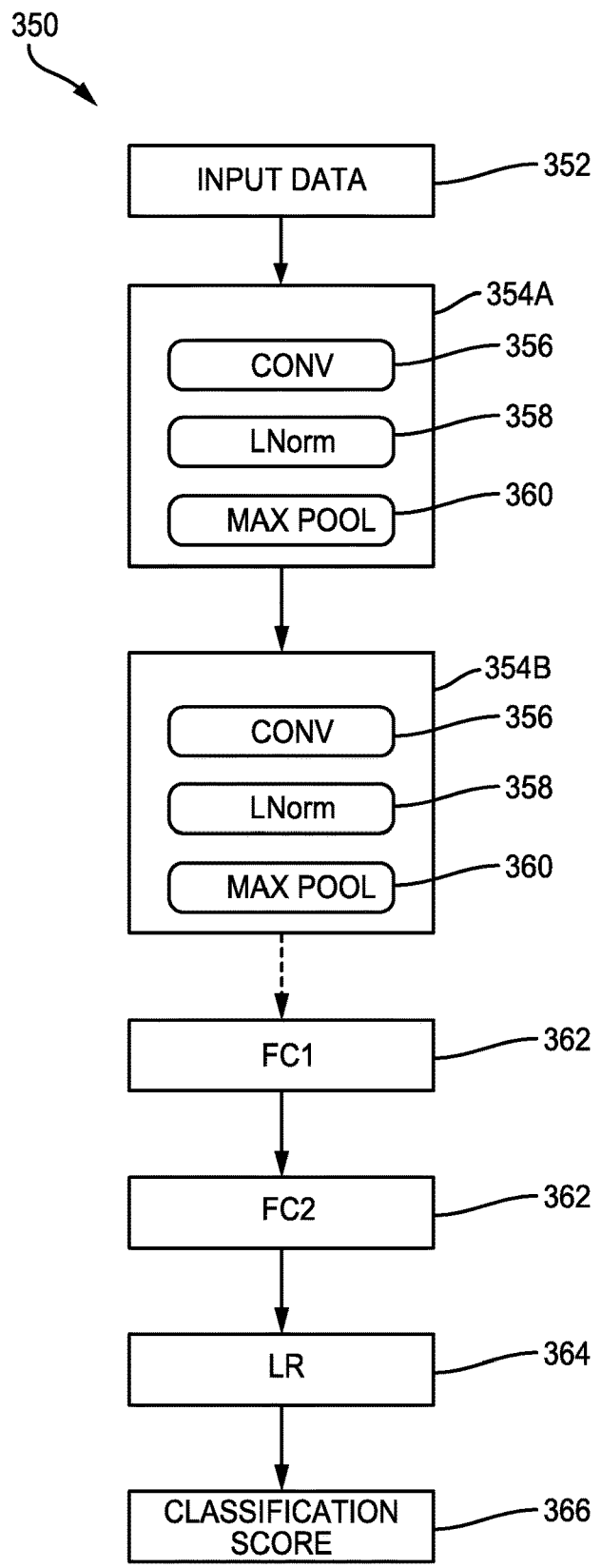
FIG. 3 is a block diagram illustrating a DCN.

FIG. 3 is a block diagram illustrating a deep convolutional network 350. The deep convolutional network 350 may include multiple different types of layers based on connectivity and weight sharing. As shown in FIG. 3, the deep convolutional network 350 includes the convolution blocks 354A, 354B. Each of the convolution blocks 354A, 354B may be configured with a convolution layer (CONV) 356, a normalization layer (LNorm) 358, and a max pooling layer (MAX POOL) 360. Deep convolutional network 350 may be used to perform video compression and/or decompression, according to aspects of the present disclosure.

The convolution layers 356 may include one or more convolutional filters, which may be applied to the input data to generate a feature map. Although only two of the convolution blocks 354A, 354B are shown, the present disclosure is not so limiting, and instead, any number of the convolution blocks 354A, 354B may be included in the deep convolutional network 350 according to design preference. The normalization layer 358 may normalize the output of the convolution filters. For example, the normalization layer 358 may provide whitening or lateral inhibition. The max pooling layer 360 may provide down sampling aggregation over space for local invariance and dimensionality reduction.

The parallel filter banks, for example, of a deep convolutional network may be loaded on a CPU 102 or GPU 104 of an SOC 100 to achieve high performance and low power consumption. In alternative aspects, the parallel filter banks may be loaded on the DSP 106 or an ISP 116 of an SOC 100. In addition, the deep convolutional network 350 may access other processing blocks that may be present on the SOC 100, such as sensor processor 114 and navigation module 120, dedicated, respectively, to sensors and navigation.

The deep convolutional network 350 may also include one or more fully connected layers 362 (FC1 and FC2). The deep convolutional network 350 may further include a logistic regression (LR) layer 364. Between each layer 356, 358, 360, 362, 364 of the deep convolutional network 350 are weights (not shown) that are to be updated. In certain aspects, the weights may be stored in an SRAM configured for in-memory computations, as described in more detail herein. The output of each of the layers (e.g., 356, 358, 360, 362, 364) may serve as an input of a succeeding one of the layers (e.g., 356, 358, 360, 362, 364) in the deep convolutional network 350 to learn hierarchical feature representations from input data 352 (e.g., images, audio, video, sensor data and/or other input data) supplied at the first of the convolution blocks 354A. The output of the deep convolutional network 350 is a classification score 366 for the input data 352. The classification score 366 may be a set of probabilities, where each probability is the probability of the input data including a feature from a set of features.

Example Static Random-Access Memory (SRAM) for In-Memory Computing

Certain aspects of the present disclosure are generally directed to a static random-access memory (SRAM) compute-in-memory (CIM) binary multiplier or binary neural network (BNN) latch for multi-bit or binary multiplication integration. Analog CIM uses analog-to-digital converters (ADCs) for performing multiplication addition computing. However, the ADCs are affected by mismatch and process/temperature variations, which adversely affect the accuracy of the CIM output. Moreover, using an SRAM differential read sensor has high power consumption since a voltage rail to reference (e.g., electric ground) direct-current (DC) path exists in this implementation. Moreover, multi-bit multiply-accumulate (MAC) circuitry may be implemented far from the memory, and communication of the data from the memory to the MAC circuitry may spend a high amount of energy. In certain aspects, a logic-based binary multiplier (e.g., a logic AND and a full adder (FA)) may be used for fast MAC computations with lower energy consumption since the CIM circuitry is implemented close to the memory.

Figure 4A:
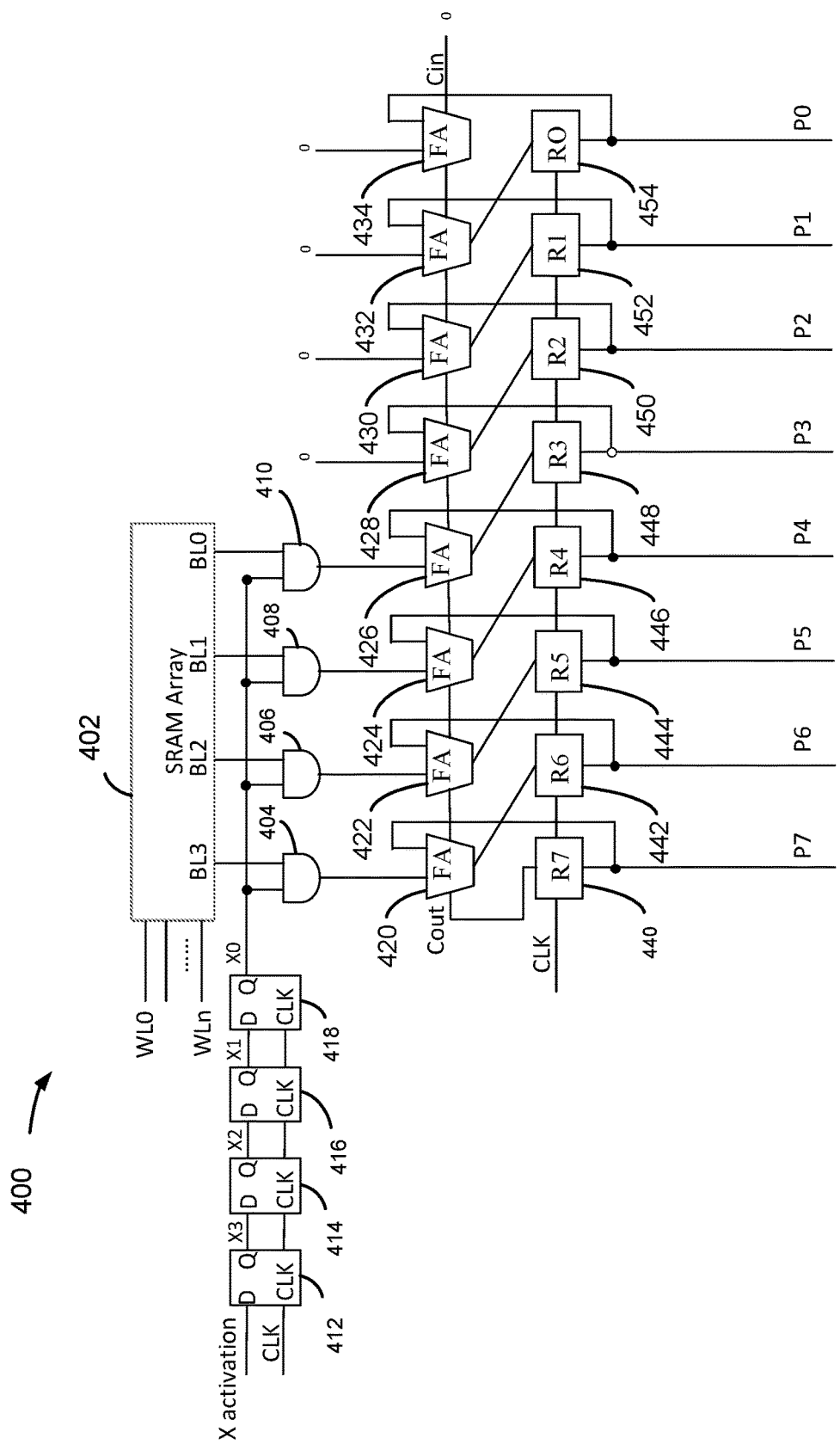
FIGS. 4A and 4B are block diagrams of a multi-bit multiplier circuit, in accordance with certain aspects of the present disclosure.

FIG. 4A is a block diagram of a multi-bit multiplier circuit 400, in accordance with certain aspects of the present disclosure. As illustrated, the multiplier circuit 400 includes an SRAM array 402 having word lines (WL0 to WLn) and bit lines (BL0 to BL3). The multiplier circuit 400 multiplies bits stored in the SRAM array 402 (four bits at bit lines BL0 to BL3) with bits X0, X1, X2, X3 at outputs of respective D registers 412, 414, 416, 418. The X activation input to the register 412 is used to provide a bit stream to registers 412, 414, 416, 418. Each bit of the bit stream is stored in one of the registers 412, 414, 416, 418 during each cycle of a clock (CLK) signal that is input to the registers 412, 414, 416, 418.

The BLs of the SRAM array 402 are coupled to respective first inputs of AND gates 404, 406, 408, 410, and the output of the D register 418 is coupled to second inputs of the AND gates 404, 406, 408, 410. In other words, during each clock cycle, the second inputs of the AND gates receive a different one of bits X0, X1, X2, and X3 in sequence. The outputs of the AND gates 404, 406, 408, 410 are coupled to respective first inputs of FAs 420, 422, 424, 426. The first inputs of the FAs 428, 430, 432, 434 are provided to a logic low signal, as illustrated. The carry-in (Cin) input of FA 434 is set to logic low. Moreover, the carry-out (Cout) output of one FA is coupled to the Cin input of a subsequent FA, from FA 434 to FA 420. As illustrated, the outputs of the FAs 420, 422, 424, 426, 428, 430, 432 are coupled to respective inputs of D registers 442, 444, 446, 448, 450, 452, 454. The Cout output of the FA 420 is coupled to the input of the D register 440. As illustrated, the second inputs of the FAs 420, 422, 424, 426, 428, 430, 432, 434 are coupled to respective outputs of the D registers 440, 442, 444, 446, 448, 450, 452, 454. The outputs of the D registers 440, 442, 444, 446, 448, 450, 452, 454 represent the respective outputs P7, P6, P5, P4, P3, P2, P1, P0 of the multi-bit multiplier circuit 400.

As illustrated, the multi-bit multiplier circuit 400 includes circuitry (e.g., AND gates) for multiplying, in a sequential fashion, each of the bits (e.g. bits X0, X1, X2, X3) of the bit stream (provided via X activation) by values (e.g., weight parameters) stored in the SRAM array 402. The multiplication results are left-shifted and added to generate the outputs P7, P6, P5, P4, P3, P2, P1, P0 of the multi-bit multiplier circuit 400. In some cases, instead of performing the multiplications in a sequential fashion, each of the bits of the bit stream may be multiplied with the weight parameters in a parallel fashion, as described in more detail with respect to FIG. 4B.

Figure 4B:
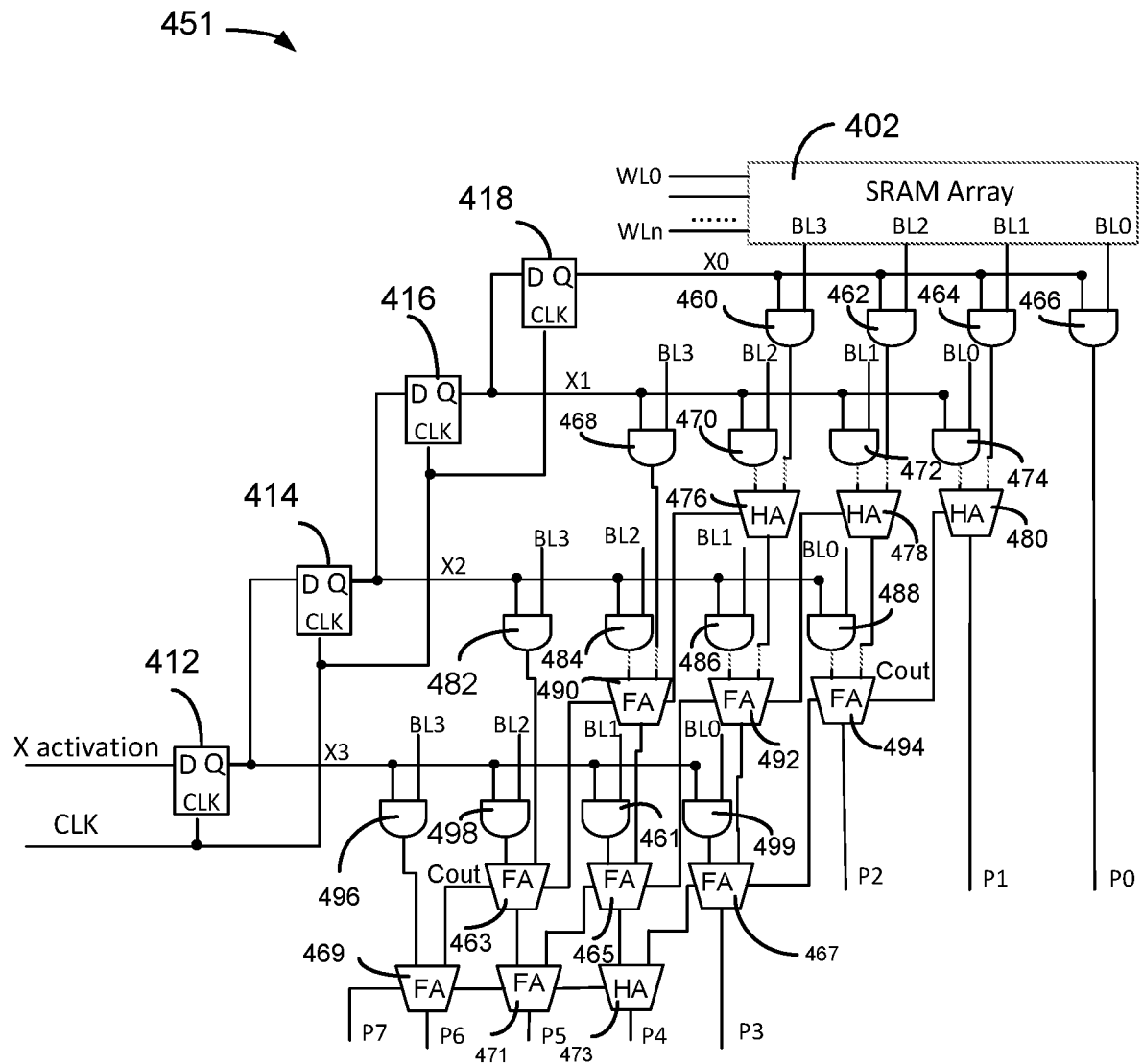

FIG. 4B is a block diagram of a multi-bit multiplier circuit 451, in accordance with certain aspects of the present disclosure. As illustrated, the output of the D register 412 is coupled to first inputs of AND gates 496, 498, 461, 499, the output of the D register 414 is coupled to first inputs of AND gates 482, 484, 486, 488, the output of the D register 416 is coupled to first inputs of AND gates 468, 470, 472, 474, and the output of the D register 418 is coupled to first inputs of AND gates 460, 462, 464, 466. The second inputs of the AND gates 460, 462, 464, 466 are coupled to BL3, BL2, BL1, BL0 of the SRAM array 402, respectively, the second inputs of the AND gates 468, 470, 472, 474 are coupled to BL3, BL2, BL1, BL0 of the SRAM array 402, respectively, the second inputs of the AND gates 482, 484, 486, 488 are coupled to BL3, BL2, BL1, BL0 of the SRAM array 402, respectively, and the second inputs of the AND gates 496, 498, 461, 499 are coupled to BL3, BL2, BL1, BL0 of the SRAM array 402, respectively. As illustrated, the output of the AND gate 466 represents the P0 output of the multi-bit multiplier circuit 451. As illustrated, various half adders (HAs) 476, 478, 480, 473 and FAs 490, 492, 494, 463, 465, 467, 469, 471 are implemented to generate the signals at outputs P1, P2, P3, P4, P5, P6, P7 of the multi-bit multiplier circuit 451. In addition to the output of the AND gate 466 representing the output P0 as described above, the output of the HA 480 represents the output P1, the output of the FA 494 represents the output P2, the output of the FA 467 represents the output P3, the output of the HA 473 represents the output P4, the output of the FA 471 represents the output P5, the output of the FA 469 represents the output P6, and the Cout output of the FA 469 represents the output P7. As illustrated, the output of the AND gates 460, 462, 464, 468, 470, 472, 474, 482, 484, 486, 488, 496, 498, 461, 499 are coupled to respective inputs of adders 476, 478, 480, 490, 476, 478, 480, 463, 490, 492, 494, 469, 463, 465, 467. The Cout output of the HA 480 is coupled to the Cin input of the FA 494, the Cout output of the HA 478 is coupled to the Cin input of the FA 492, the Cout output of the HA 476 is coupled to the Cin input of the FA 490, the Cout output of the FA 494 is coupled to the Cin input of the FA 467, the Cout output of the FA 492 is coupled to the Cin input of the FA 465, the Cout output of the FA 490 is coupled to the Cin input of the FA 463, the Cout output of the FA 467 is coupled to an input of the HA 473, the Cout output of the FA 465 is coupled to an input of the FA 471, and the Cout output of the FA 463 is coupled to an input of the FA 469. The outputs of the FAs 465, 463 are coupled to respective inputs of the HA 473 and the FA 471. As illustrated, the Cout output of the HA 473 is coupled to the Cin input of the FA 471, and the Cout output of the FA 471 is coupled to the Cin input of the FA 469.

Figure 5:
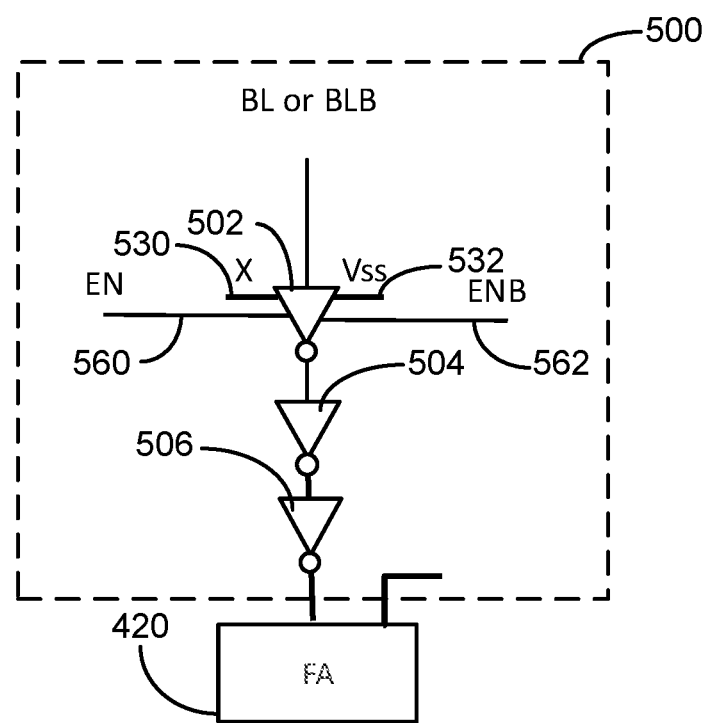
FIG. 5 illustrates a computation circuit for implementing an AND gate, in accordance with certain aspects of the present disclosure.

FIG. 5 illustrates a computation circuit 500 for implementing an AND gate (e.g., any one of the AND gates described with respect to FIGS. 4A and 4B), in accordance with certain aspects of the present disclosure. The computation circuit 500 includes a CIM circuit 502 that receives an input (e.g., X0 of FIG. 4A) at an input node 530 and a reference potential (electric ground potential) at reference potential node 532 (labeled "Vss"). The input of the CIM circuit 502 may be coupled to a BL (or BLB) of the SRAM array 402. As illustrated, two inverters 504, 506 may be coupled in series to the output of the CIM circuit 502. The CIM circuit 502 may receive an enable (EN) signal 560 and a complementary enable (ENB) signal 562, as described in more detail herein. The output of the computation circuit 500 is coupled to an adder (e.g., FA 420) for multi-bit multiplication, as described herein with respect to FIGS. 4A and 4B.

Figure 6A:
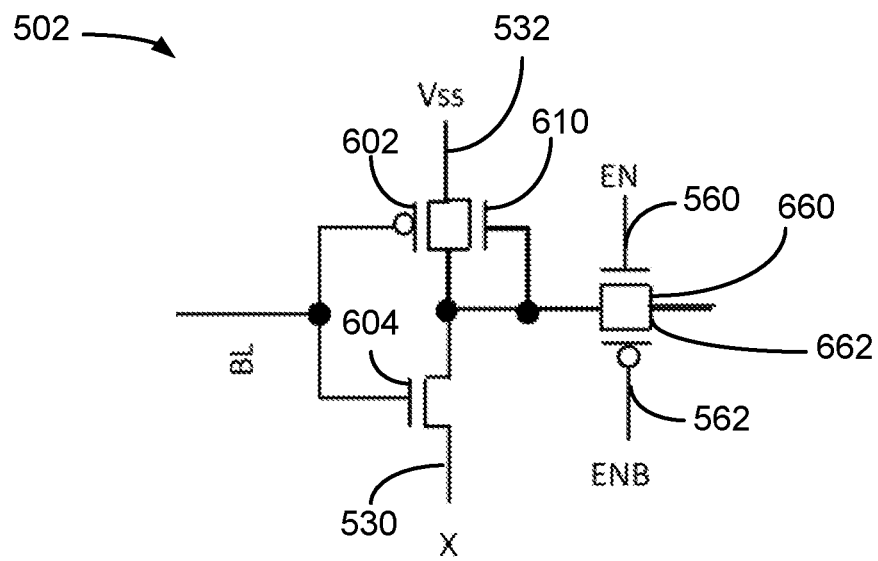
FIGS. 6A and 6B illustrate example implementations of a compute-in-memory (CIM) circuit, in accordance with certain aspects of the present disclosure.
Figure 6B:
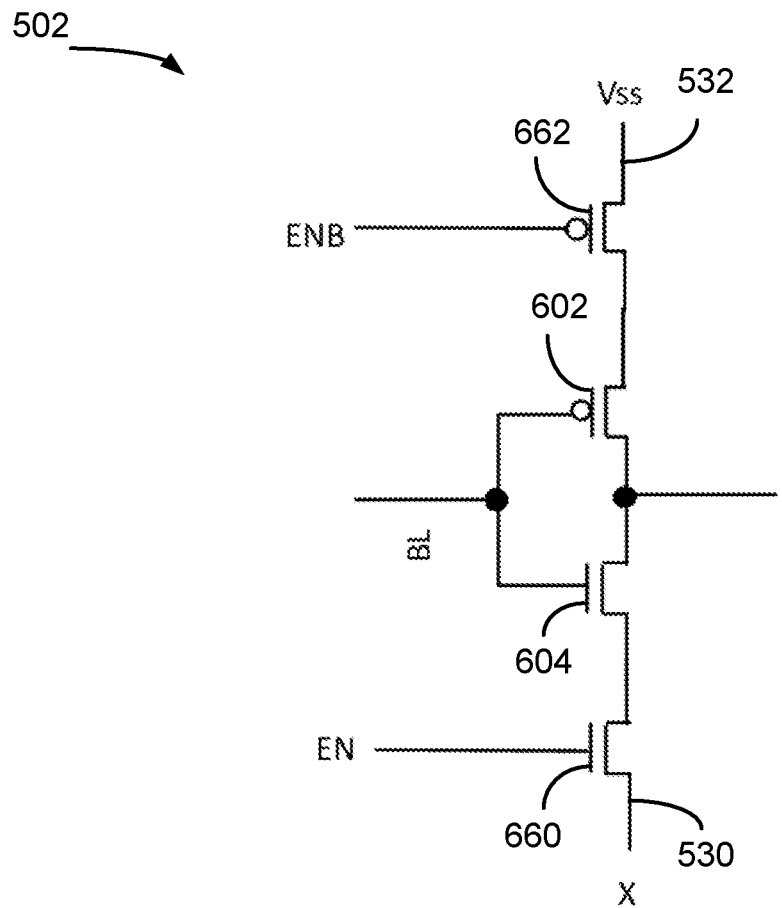

FIGS. 6A and 6B illustrate example implementations of the CIM circuit 502, in accordance with certain aspects of the present disclosure. As illustrated in FIG. 6A, the CIM circuit 502 may include a p-type metal-oxide-semiconductor (PMOS) transistor 602 and an n-type metal-oxide-semiconductor (NMOS) transistor 604 having a drain coupled to a drain of the PMOS transistor 602. The inputs of the PMOS transistor 602 and the NMOS transistor 604 may be coupled to the BL (or BLB) of the SRAM array 402. In some cases, an NMOS transistor 610 may be coupled in parallel with the PMOS transistor 602, as illustrated, to implement a transmission gate. The gate of the NMOS transistor 610 may be coupled to the drains of the PMOS transistor 602 and the NMOS transistor 604.

As illustrated in FIG. 6A, the EN signal 560 is provided to a gate of an NMOS transistor 660, and the ENB signal 562 is provided to a gate of a PMOS transistor 662. The NMOS transistor 660 and the PMOS transistor 662 are coupled in parallel, forming a transmission gate. The transmission gate electrically couples the drains of the PMOS transistor 602 and the NMOS transistor 604 to the output of the CIM circuit 502 when the EN signal 560 is logic high.

As illustrated, the source of the NMOS transistor 530 may be coupled to the input X (e.g., corresponding to input X0 in FIG. 4A) at the input node 530, and the source of the PMOS transistor may be coupled to Vss (e.g., electric ground). In other words, the output of the CIM circuit 502 may be logic high only when both the input X and the BL at the gates of the PMOS transistor 602 and the NMOS transistor 604 are logic high, in effect implementing an AND gate. As illustrated in FIG. 6B, the NMOS transistor 660 may be coupled between the source of the NMOS transistor 604 and the input node 530, and the PMOS transistor 662 may be coupled between the reference potential node 532 and the source of the PMOS transistor 602, in certain implementations.

Figure 7A:
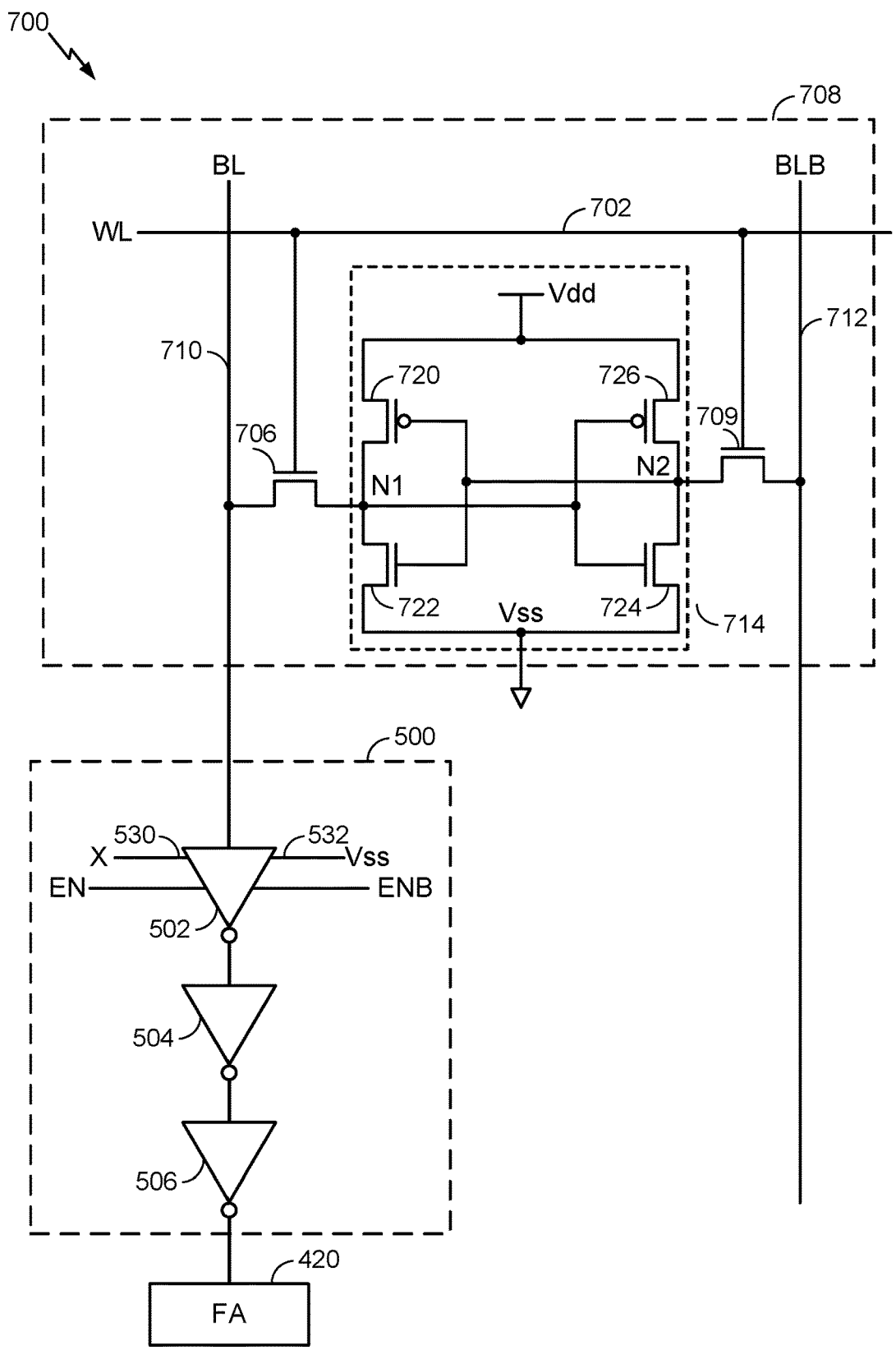
FIGS. 7A-7C illustrate example computation systems having a memory cell implemented for CIM, in accordance with certain aspects of the present disclosure.
Figure 7B:
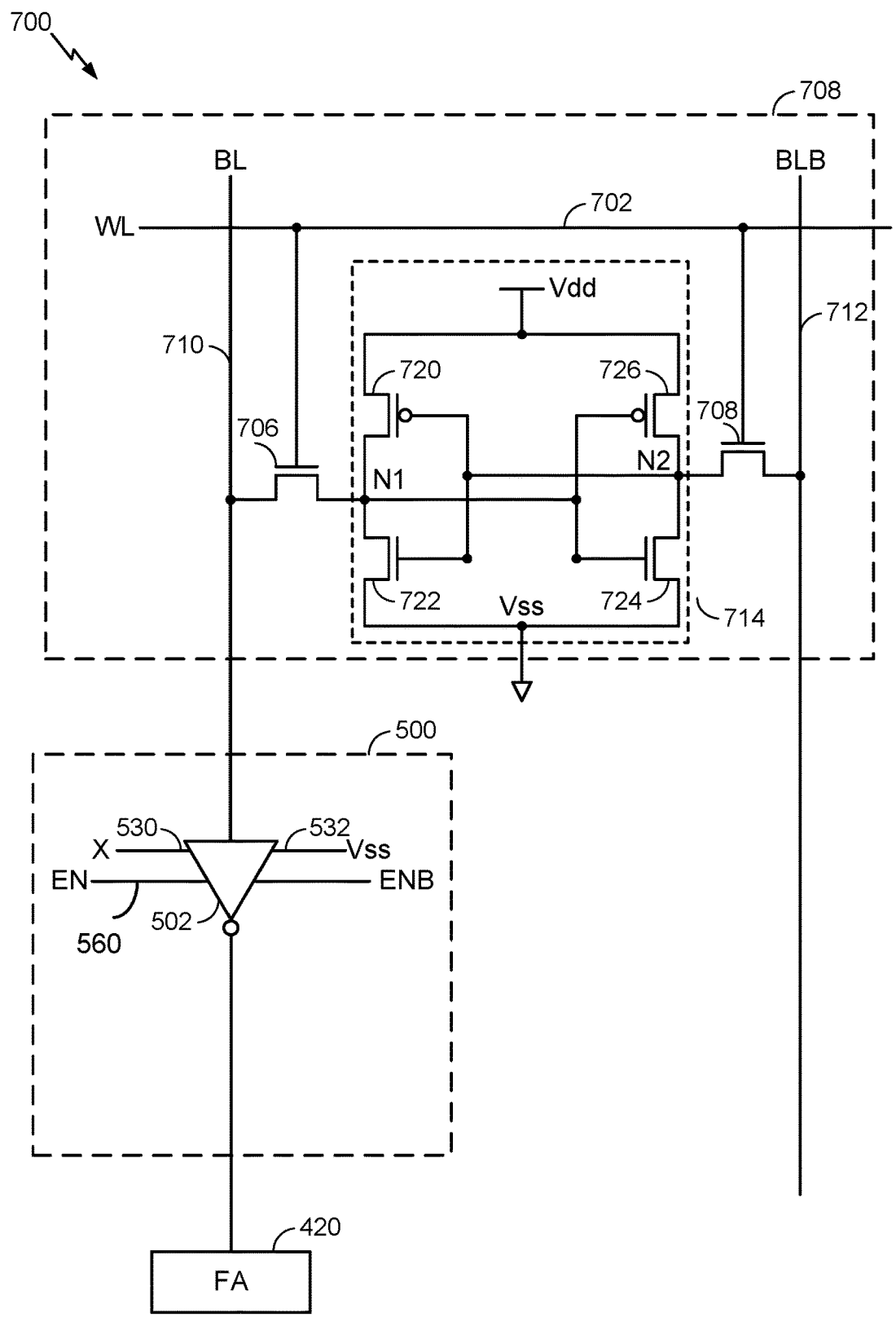
Figure 7C:
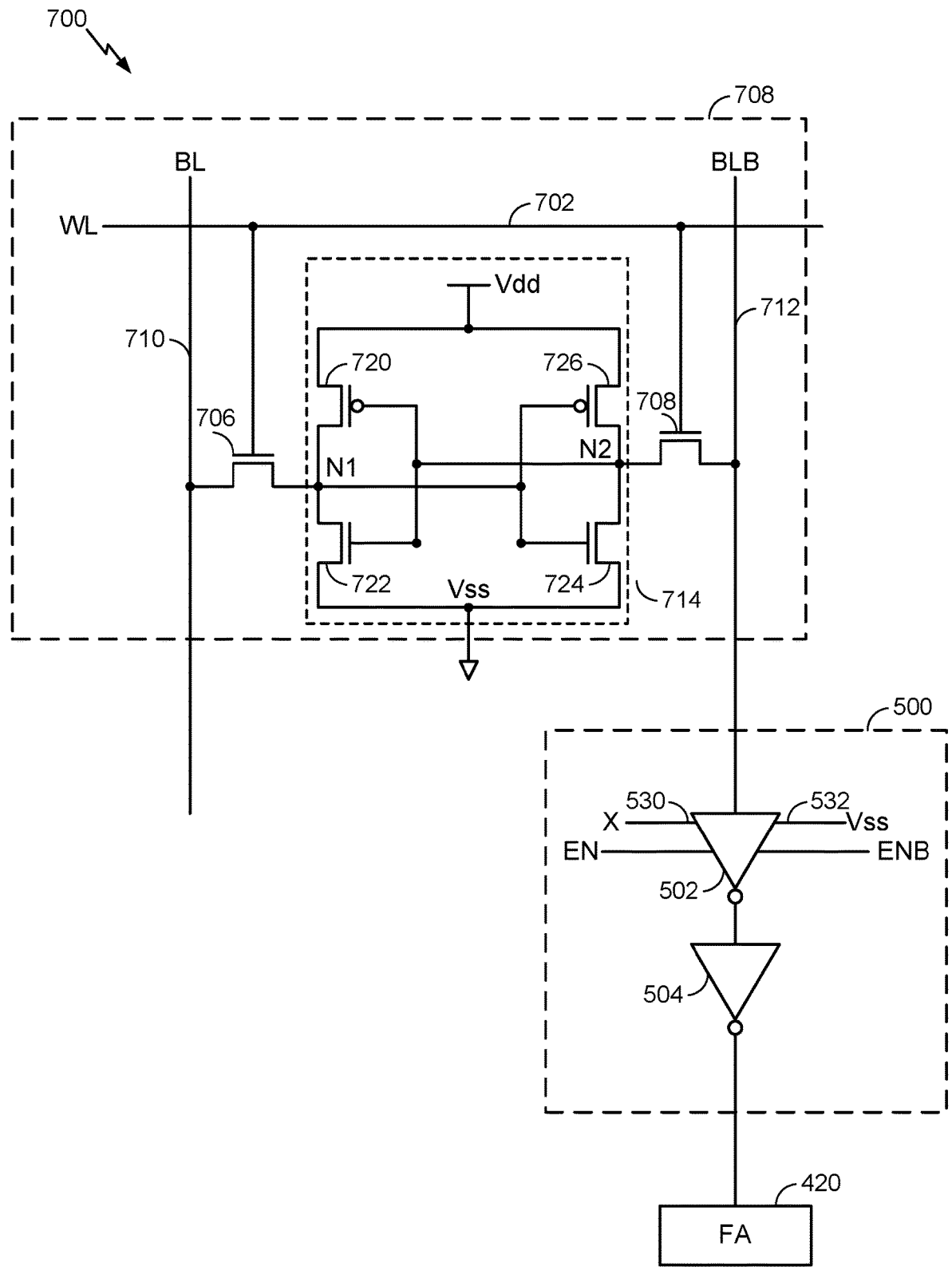

FIGS. 7A-7C illustrate example implementations of a computation system 700 having an SRAM cell 708 implemented for CIM, in accordance with certain aspects of the present disclosure. The SRAM cell 708 may be part of the SRAM array 402 including an array of word lines (WLs). Moreover, the SRAM array may include an array of bit lines (BLs), each having a complementary bit line (BLB). Each of the intersections of the BLs and WLs is associated with an SRAM cell (e.g. SRAM cell 708).

As illustrated, the WL 702 is coupled to control inputs of pass gate (PG) transistors 706, 709 for selectively coupling respective bit lines (BL 710, BLB 712) to respective nodes N1, N2 (also referred to as an output node (e.g., SRAM internal output node), and a complementary output node (e.g., SRAM internal complementary output node), respectively) of a flip-flop (FF) 714. The pass gate transistor 706 and/or the pass gate transistor 709 may each be implemented using a metal-oxide-semiconductor (MOS) transistor.

As illustrated, the FF 714 is coupled between a voltage rail (Vdd) and a reference potential node (e.g., electric ground or Vss). The FF 714 includes a p-type metal-oxide-semiconductor (PMOS) transistor 720 having a drain coupled to a drain of an n-type metal-oxide-semiconductor (NMOS) transistor 722, forming part of node N1. The FF 714 also includes a PMOS transistor 726 having a drain coupled to a drain of an NMOS transistor 724, forming part of node N2. The gates of the PMOS transistor 720 and the NMOS transistor 722 are coupled to the node N2, and the gates of the PMOS transistor 726 and the NMOS transistor 724 are coupled to the node N1, as illustrated. The nodes N1, N2 represent the output and complementary output nodes of the FF 714, respectively. In certain aspects, a weight parameter for the neural network may be stored in the FF 714 at nodes N1, N2 of each of the memory cells of the SRAM. The weight parameter may be available for multiplication at the BL 710 or BLB 712.

As illustrated, the computation circuit 500 may be coupled to the BL 710 for multiplication of a bit stored in the SRAM cell 708 and a bit at the input node 530. As illustrated in FIG. 7B, the computation circuit 500 may be implemented without inverters 504, 506. In certain aspects, the BL 710 may be precharged prior to the PG transistor 706 being closed for the AND operation. That is, the WL 702 may be set to logic high, after which the computation circuit 500 is enabled by setting the enable signal 560 to logic high. The input X at the input node 530 is then applied for the AND operation to occur. As illustrated in FIG. 7C, the computation circuit 500 may be coupled to the BLB 712, instead of to the BL 710. In this case, only a single inverter 504 may be coupled between the CIM circuit 502 and the FA 420. Moreover, instead of precharging the BL 710, BLB 712 may be precharged in this implementation. The implementations described with respect to FIGS. 7A, 7B, and 7C do not use a sense amplifier for performing a read operation of the SRAM, resulting in reduced energy consumption.

FIG. 7D illustrates a truth table 701 corresponding to the computation system 700, in accordance with certain aspects of the present disclosure. The truth table 701 illustrates logic operations using both binary ("0" and "1") and ternary ("+1" and "−1") logic. The weight parameter of the truth table 701 may correspond to a bit stored at the BL 710 if the computation circuit 500 is coupled to the BL 710 (e.g., as described with respect to FIGS. 7A, and 7B), or the BLB 712 if the computation circuit 500 is coupled to the BLB 712 (e.g., as described with respect to FIG. 7C).

Figure 8A:
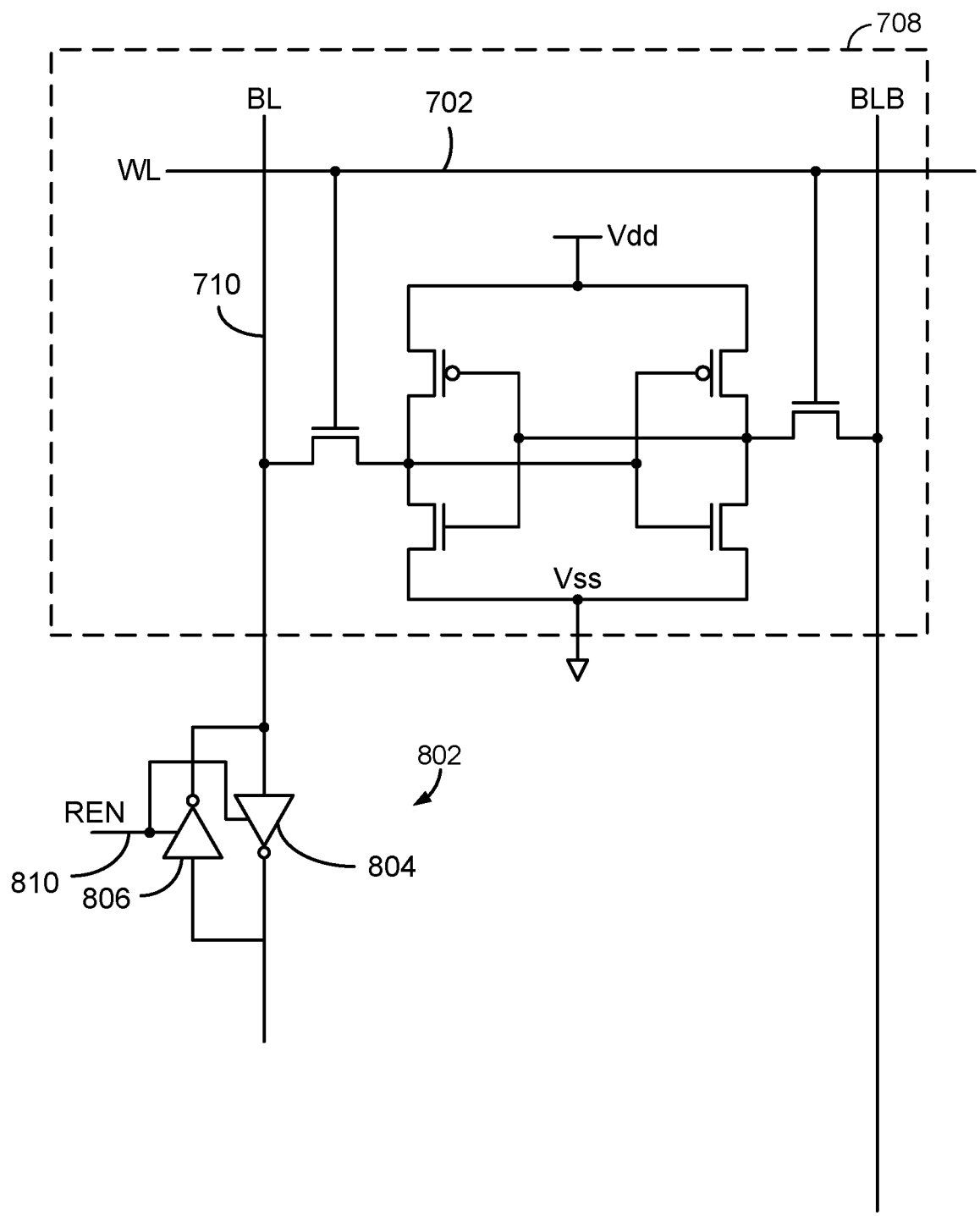
FIGS. 8A-8C illustrate computation systems implemented with a digital latch circuit, in accordance with certain aspects of the present disclosure.
Figure 8B:
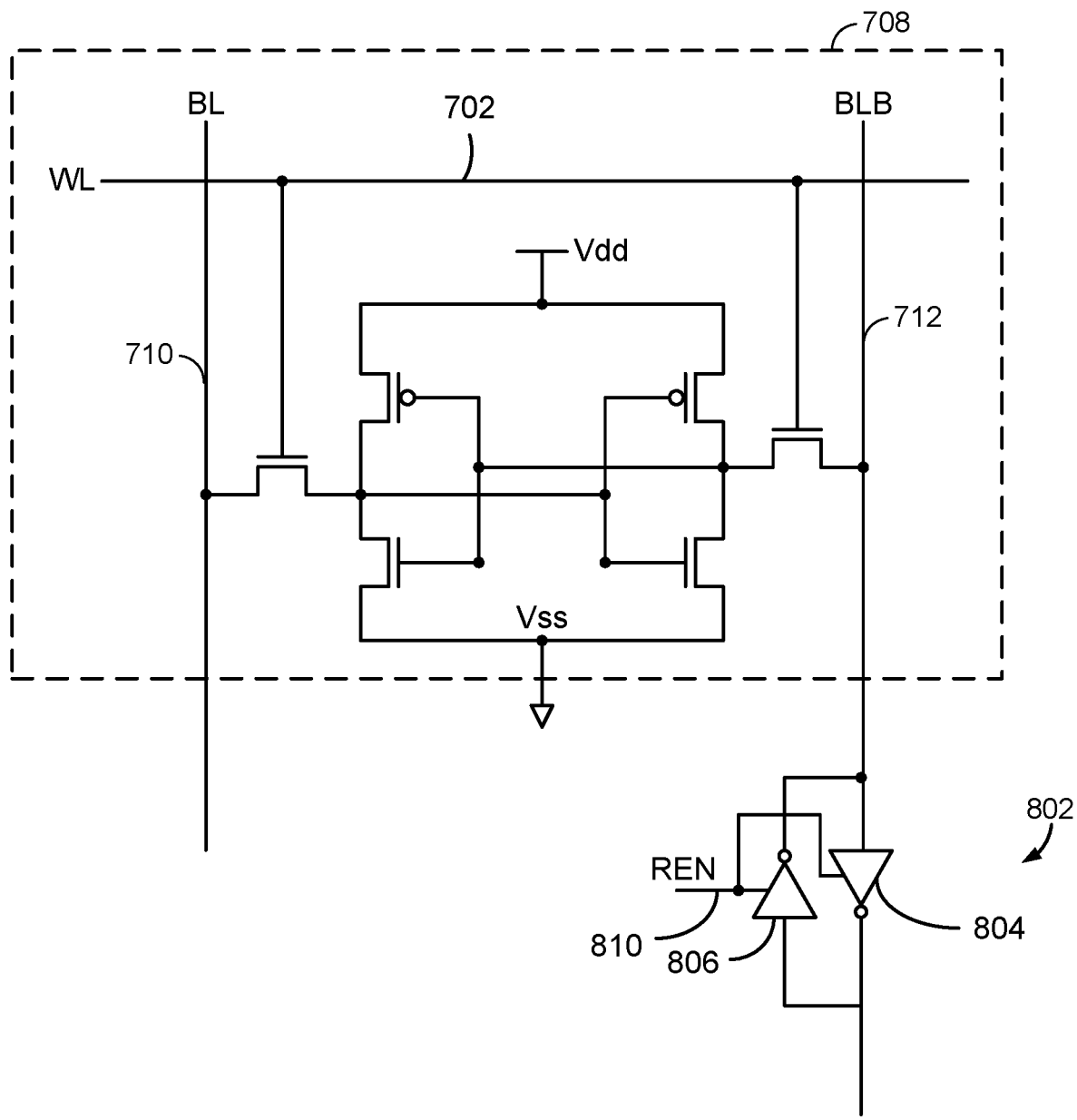
Figure 8C:
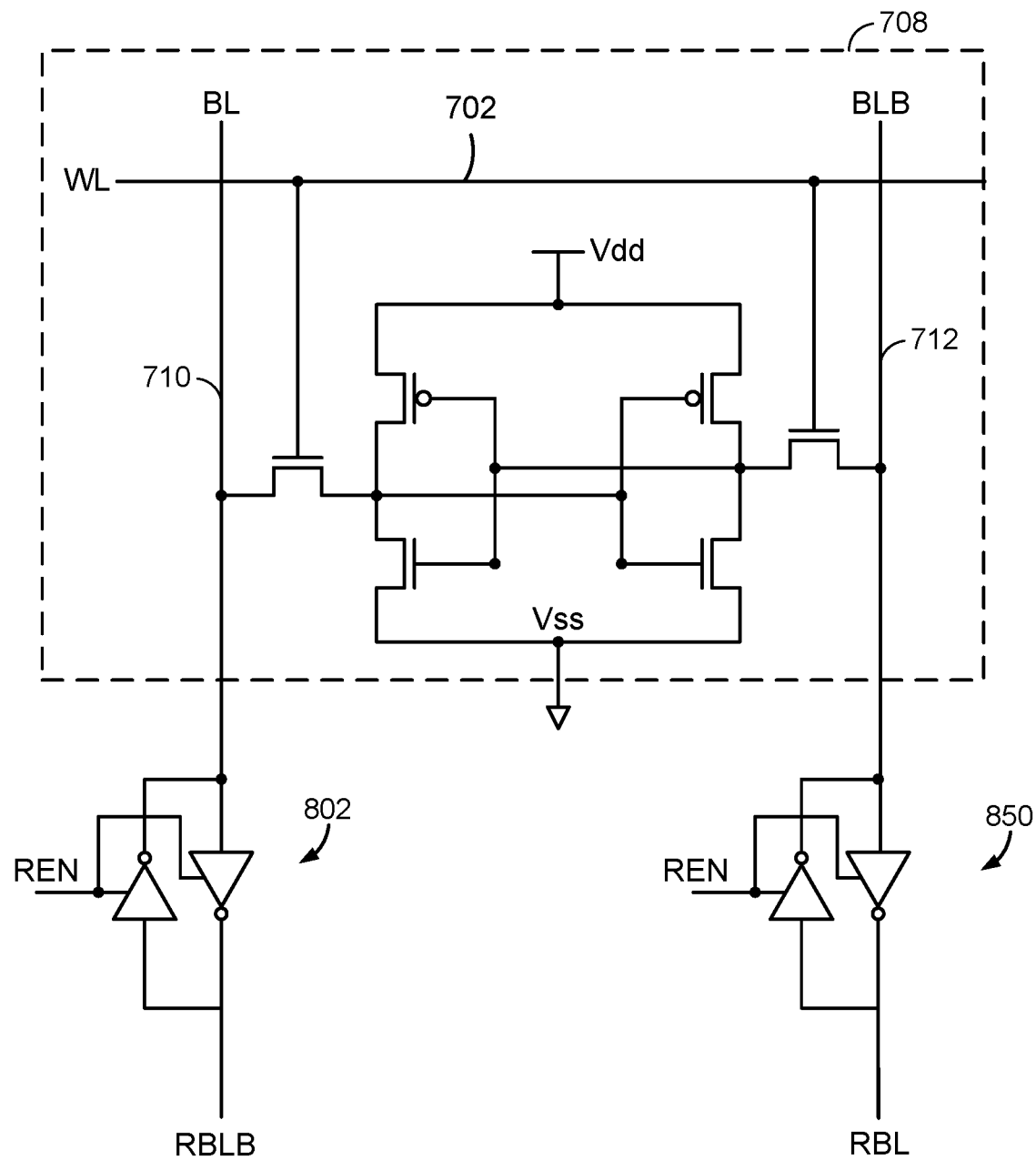

FIGS. 8A-8C illustrate computation systems implemented with a digital latch circuit 802, in accordance with certain aspects of the present disclosure. As illustrated in FIG. 8A, the digital latch circuit 802 may be coupled to the BL 710. The digital latch circuit 802 includes inverters 804, 806, the output of the inverter 804 being coupled to the input of the inverter 806, and vice versa. As illustrated, the inverters 804, 806 may receive read enable (REN) signal 810, as described in more detail herein. In some cases, the inverters 804, 806 may also receive a complementary read enable (RENB) (not shown in FIG. 8A).

Figure 9A:
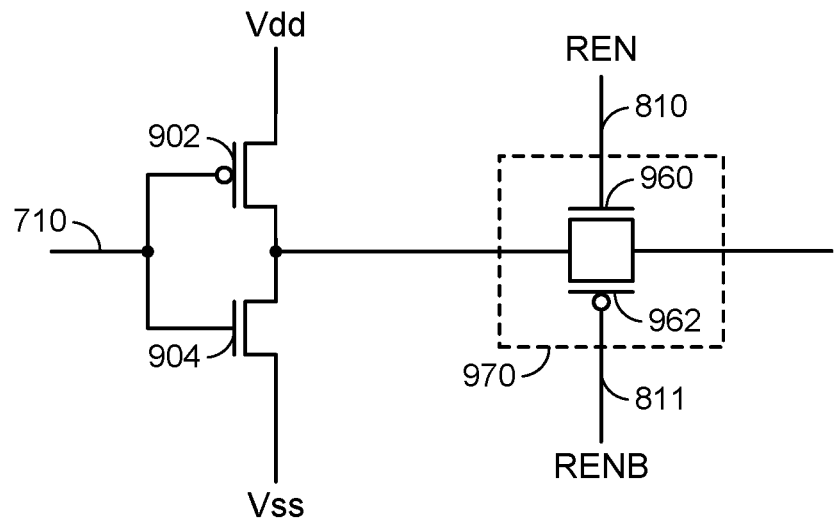
FIGS. 9A and 9B illustrate example implementations of an inverter, in accordance with certain aspects of the present disclosure.
Figure 9B:
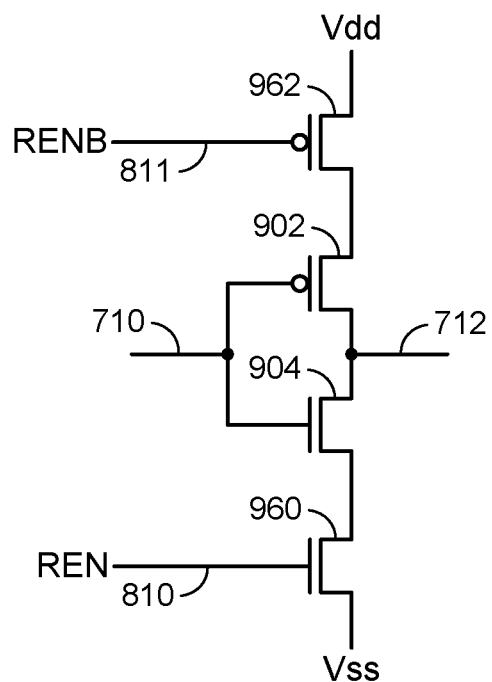

FIGS. 9A and 9B illustrate example implementations of the inverter 804 or inverter 806, in accordance with certain aspects of the present disclosure. As illustrated in FIG. 9A, the inverter may include a PMOS transistor 902 and an NMOS transistor 904 having a drain coupled to a drain of the PMOS transistor 902. The gates of the PMOS transistor 902 and the NMOS transistor 904 may be coupled to the BL 710 (or BLB, in some implementations) of the SRAM cell 708. The source of the PMOS transistor 902 may be coupled to a voltage rail Vdd, and the source of the NMOS transistors 904 may be coupled to a reference potential node (e.g., electric ground or Vss).

As illustrated, the REN signal 810 may be provided to a gate of an NMOS transistor 960, and a RENB signal 811 may be provided to a gate of a PMOS transistor 962. The NMOS transistor 960 and the PMOS transistor 962 are coupled in parallel, forming a transmission gate 970. The transmission gate 970 electrically couples the drains of the PMOS transistor 902 and the NMOS transistor 904 to the output of the inverter 804 (or inverter 806) when the REN signal 810 is logic high (and/or the RENB signal 811 is logic low). As illustrated in FIG. 9B, the PMOS transistor 962 may be coupled between the source of the PMOS transistor 902 and the voltage rail Vdd, and the NMOS transistor 960 may be coupled between the reference potential node Vss and the source of the NMOS transistor 904. As illustrated in FIG. 8B, the digital latch circuit 802 may be coupled to the BLB 712. As illustrated in FIG. 8C, the digital latch circuit 802 may be coupled to the BL 710, and another digital latch circuit 850 may be coupled to the BLB 712.

The digital latch circuit allows for high parallel read throughput for the SRAM. After the WL 702 is set to logic high, the REN signal may be set to logic high to enable the digital latch circuit for inverter feedback to the BL (or BLB). The BL (or BLB) latch inverter feedback enhances the speed at which BLs of the SRAM may be swept for a read operation.

FIG. 8D illustrates a truth table 801 corresponding to the computation system of FIG. 8C, in accordance with certain aspects of the present disclosure. The truth table 801 illustrates logic operations using both binary ("0" and "1") and ternary ("+1" and "−1") logic. As illustrated, the read bit-line (RBL) corresponds to the output of the digital latch circuit 850 coupled to the BLB 712, and the complementary RBL (RBLB) corresponds to the output of the digital latch circuit 802 coupled to the BL 710. In certain implementations, the output of the digital latch circuit 802 may be used as the RBL, and the output of the digital latch circuit 850 may be used as the RBLB.

Figure 10:
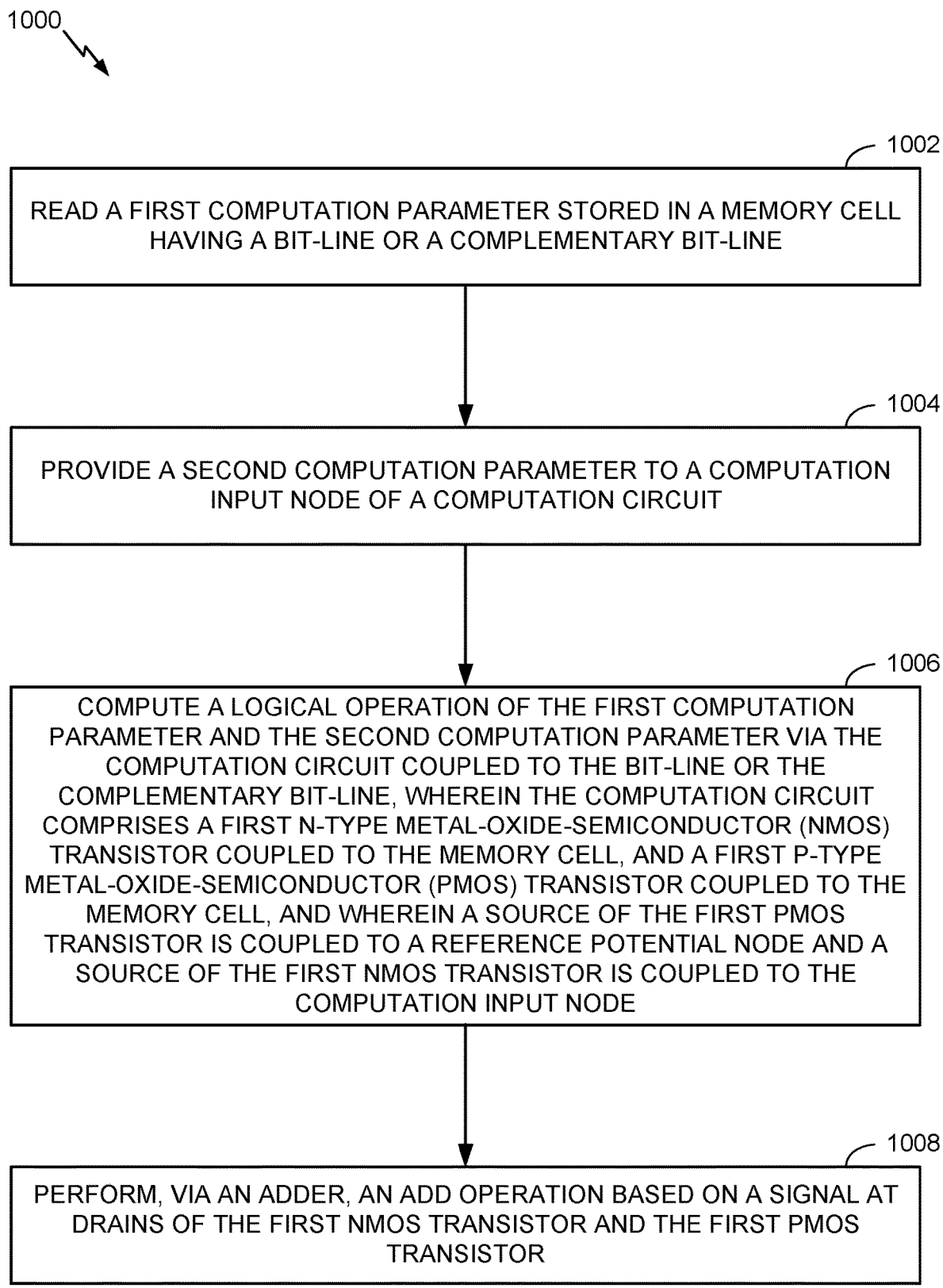
FIG. 10 is a flow diagram illustrating example operations for binary computation, in accordance with certain aspects of the present disclosure.

FIG. 10 is a flow diagram illustrating example operations 1000 for binary computation, in accordance with certain aspects of the present disclosure. The operations 1000 may be performed by circuitry, such as the circuitry described with respect to FIGS. 4A, 4B, 5, 6A, 6B, 7A-7D, 8A-8D, 9A, and/or 9B.

The operations 1000 begin, at block 1002, with the circuitry reading a first computation parameter stored in a memory cell (e.g., SRAM cell 708) having at least one of a bit-line (e.g., BL 710) or a complementary bit-line (BLB 712), at block 1004, providing a second computation parameter to a computation input node of a computation circuit (e.g., computation circuit 500). At block 1006, the circuitry computes a logical operation (e.g., AND operation) of the first computation parameter and the second computation parameter via the computation circuit coupled to the bit-line or the complementary bit-line, wherein the computation circuit comprises a first n-type metal-oxide-semiconductor (NMOS) transistor (e.g., NMOS transistor 604) coupled to the memory cell, and a first p-type metal-oxide-semiconductor (PMOS) transistor (e.g., PMOS transistor 602) coupled to the memory cell, wherein a source of the first PMOS transistor is coupled to a reference potential node (e.g., Vss), and wherein a source of the first NMOS transistor is coupled to the computation input node. At block 1008, the computation circuitry performs (e.g., via an adder 420) an add operation based on a signal at drains of the first NMOS transistor and the first PMOS transistor.

In certain aspects, gates of the first NMOS transistor and the first PMOS transistor are coupled to the bit-line. In certain aspects, gates of the first NMOS transistor and the first PMOS transistor are coupled to the complementary bit-line.

In certain aspects, the operations 1000 also include enabling the computation circuit via an enable signal (e.g., EN signal 560) provided to an enable node of an enable circuit and a complementary enable signal (e.g., ENB signal 562) provided to a complementary enable node of the enable circuit. The enable circuit may include a second NMOS transistor (e.g., NMOS transistor 660) coupled between the computation input node and the first NMOS transistor, a gate of the second NMOS transistor being coupled to the enable node, and a second PMOS transistor (e.g., PMOS transistor 662) coupled between the reference potential node and the first PMOS transistor, a gate of the second PMOS transistor being coupled to the complementary enable node.

In certain aspects, the enable circuit may include a second NMOS transistor (e.g., NMOS transistor 660) coupled between the adder and the drains of the first NMOS transistor and the first PMOS transistor, a gate of the second NMOS transistor being coupled to the enable node. In some cases, the enable circuit also includes a second PMOS transistor (e.g., PMOS transistor 662) having a source coupled to a drain of the second NMOS transistor and a drain coupled to a source of the second NMOS transistor, a gate of the second PMOS transistor being coupled to the complementary enable node.

In certain aspects, the computation input node comprises an output of a register (e.g., register 418). In certain aspects, the computation circuit further includes a first inverter (e.g., inverter 504) coupled between the adder and the drains of the first NMOS transistor and the first PMOS transistor.

The various illustrative circuits described in connection with aspects described herein may be implemented in or with an integrated circuit (IC), such as a processor, a digital signal processor (DSP), an application-specific integrated circuit (ASIC), a field-programmable gate array (FPGA), or other programmable logic device. A processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is also noted that the operational steps described in any of the exemplary aspects herein are described to provide examples. The operations described may be performed in numerous different sequences other than the illustrated sequences. Furthermore, operations described in a single operational step may actually be performed in a number of different steps. Additionally, one or more operational steps discussed in the exemplary aspects may be combined. It is to be understood that the operational steps illustrated in the flow diagrams may be subject to numerous different modifications as will be readily apparent to one of skill in the art. Those of skill in the art will also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various operations of methods described above may be performed by any suitable means capable of performing the corresponding functions. The means may include various hardware and/or software component(s) and/or module(s), including, but not limited to a circuit, an application-specific integrated circuit (ASIC), or processor. Generally, where there are operations illustrated in figures, those operations may have corresponding counterpart means-plus-function components with similar numbering.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

The present disclosure is provided to enable any person skilled in the art to make or use aspects of the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

What is claimed is:

1. A circuit for binary multiplication, comprising:
    a memory cell having at least one of a bit-line or a complementary bit-line;
    a computation circuit coupled to a computation input node of the circuit and the bit-line or the complementary bit-line; and
    an adder coupled to the computation circuit, wherein the computation circuit comprises:
        a first n-type metal-oxide-semiconductor (NMOS) transistor coupled to the memory cell,
        a first p-type metal-oxide-semiconductor (PMOS) transistor coupled to the memory cell, drains of the first NMOS transistor and the first PMOS transistor being coupled to the adder, wherein a source of the first PMOS transistor is coupled to a reference potential node, and wherein a source of the first NMOS transistor is coupled to the computation input node, and
        an enable circuit comprising a second NMOS transistor coupled between the adder and the drains of the first NMOS transistor and the first PMOS transistor, a gate of the second NMOS transistor being coupled to an enable node.

2. The circuit of claim 1, wherein gates of the first NMOS transistor and the first PMOS transistor are coupled to the bit-line.

3. The circuit of claim 1, wherein gates of the first NMOS transistor and the first PMOS transistor are coupled to the complementary bit-line.

4. The circuit of claim 1, wherein the computation circuit is configured to perform an AND operation.

5. The circuit of claim 1, wherein the enable circuit further comprises:
    a second PMOS transistor having a source coupled to a drain of the second NMOS transistor and a drain coupled to a source of the second NMOS transistor, a gate of the second PMOS transistor being coupled to a complementary enable node.

6. The circuit of claim 1, wherein the memory cell is one of a plurality of memory cells of a static random-access memory (SRAM).

7. The circuit of claim 1, wherein the computation circuit further comprises a first inverter coupled between the adder and the drains of the first NMOS transistor and the first PMOS transistor.

8. The circuit of claim 7, wherein gates of the first NMOS transistor and the first PMOS transistor are coupled to the bit-line, and wherein the computation circuit further comprises a second inverter between the adder and the first inverter.

9. The circuit of claim 1, wherein the computation input node comprises an output of a register.

10. A method for binary computation, comprising:
    reading a first computation parameter in a memory cell having at least one of a bit-line or a complementary bit-line;
    providing a second computation parameter to a computation input node of a computation circuit;
    computing a logical operation of the first computation parameter and the second computation parameter via the computation circuit coupled to the bit-line or the complementary bit-line, wherein the computation circuit comprises a first n-type metal-oxide-semiconductor (NMOS) transistor coupled to the memory cell, and a first p-type metal-oxide-semiconductor (PMOS) transistor coupled to the memory cell, wherein a source of the first PMOS transistor is coupled to a reference potential node, and wherein a source of the first NMOS transistor is coupled to the computation input node;
    enabling the computation circuit via an enable signal provided to an enable node of an enable circuit, wherein the enable circuit comprises a second NMOS transistor coupled between the adder and the drains of the first NMOS transistor and the first PMOS transistor, a gate of the second NMOS transistor being coupled to the enable node; and
    performing, via an adder, an add operation based on a signal at drains of the first NMOS transistor and the first PMOS transistor.

11. The method of claim 10, wherein the logical operation comprises an AND operation.

12. The method of claim 10, wherein gates of the first NMOS transistor and the first PMOS transistor are coupled to the bit-line.

13. The method of claim 10, wherein gates of the first NMOS transistor and the first PMOS transistor are coupled to the complementary bit-line.

14. The method of claim 10, wherein the computation circuit is further enabled via a complementary enable signal provided to a complementary enable node of the enable circuit, the enable circuit further having:
    a second PMOS transistor having a source coupled to a drain of the second NMOS transistor and a drain coupled to a source of the second NMOS transistor, a gate of the second PMOS transistor being coupled to the complementary enable node.

15. The method of claim 10, wherein the computation input node comprises an output of a register.

16. The method of claim 10, wherein the computation circuit further comprises a first inverter coupled between the adder and the drains of the first NMOS transistor and the first PMOS transistor.

* * * * *